April 21, 1953     R. E. GRAHAM     2,636,149

MOTOR CONTROL SYSTEM

Filed Jan. 8, 1949

INVENTOR
R. E. GRAHAM
BY
*N. S. Ewing*
ATTORNEY

Patented Apr. 21, 1953

2,636,149

UNITED STATES PATENT OFFICE 2,636,149

MOTOR CONTROL SYSTEM

Robert E. Graham, Morristown, N. J., assignor to Bell Telephone Laboratories, Incorporated, New York, N. Y., a corporation of New York Application January 8, 1949, Serial No. 69,967

8 Claims. (Cl. 318—23.5)

This invention relates to servo-mechanisms and control of servo-motors.

A servo system or servo-mechanism serves to reproduce a signal that may differ with respect to place, power level or form from the original signal but is under its control. Usually the input and output servo signals are low frequency motions or mechanical signals, as for example in cases in which the angular motions and positions of an input shaft that vary with time are reproduced by those of an output shaft driving a load. Ordinarily the input shaft drives an electromechanical transducer whose electrical output signal is amplified by a vacuum tube amplifier, and the amplified signal voltage is applied to a servo-motor for conversion into mechanical torque, the rotation of the motor armature being transmitted (usually through speed reduction gearing) to the output shaft.

The signal reproduced by the servo-motor commonly includes constant speed or unvarying mechanical velocity (which is analogous to current of zero frequency, i. e., direct current), and zero speed (which corresponds to current of zero amplitude). The signal spectrum seldom extends above a few cycles per second. Often the highest signal frequency of interest is less than a tenth of a cycle per second.

The servo-motor often needs to run smoothly even at very low speeds, as for example a fraction of a radian per second. This means that great interest attaches to the response of the motor at very low values of signal input voltage. In other words, the motor response should be linear near the origin of the motor speed versus signal-input characteristic. Resistance constituted by the sum of the motor's internal friction and the friction of the load is non-linear and irregular especially at low input amplitudes, and therefore tends to cause the motor's response to be non-linear and irregular at such amplitudes. The precision of response of the motor is usually expressed in terms of position. The required precision in position is often of the order of half a revolution of the motor shaft.

The linearity of response just referred to concerns the response as a function of amplitude. The response as a function of frequency is also important.

The speed-change response of a servo-motor with respect to the frequency of the input-voltage change depends on the time constant of the motor or the ratio of the inertia effects of the motor and the load to the apparent viscous friction of the motor and its driving circuit. In other words, the inertia that is constituted by the motor inertia and the load inertia tends to produce frequency discrimination by increasing the time constant of the motor and thus limiting the frequency of the input voltage that the motor can effectively follow.

An object of the invention is to reduce non-linearities and irregularities of speed response of the amplifier and motor combination that are due to friction.

It is also an object of the invention to reduce the time constant of the amplifier and motor.

In accordance with the invention these objects may be accomplished by positive feedback of energy series-derived from the amplifier output circuit, to reduce the driving impedance (i. e., output impedance) of the amplifier or render it negative.

As a further feature, the invention may include negative feedback of energy shunt-derived from the amplifier output circuit in addition to positive feedback of energy series-derived from the amplifier output circuit. Such feedback renders it possible to obtain a larger magnitude of negative impedance, for a given stability margin.

Other objects, aspects and features of the invention will be apparent from the following description, with reference to the accompanying drawings.

Where the armature circuit control of a direct current motor is used, the effect of reducing the driving resistance facing the armature winding is to reduce the apparent time constant of the motor and control circuit. This change is also accompanied by a proportional lowering of the minimum smooth-running speed of the motor; that is, the tendency of irregular frictional torques to cause speed fluctuations is reduced. These effects of reduced driving impedance are also found with two-phase induction motors, where the control voltage is applied to one winding and the excitation voltage to the other.

The present invention shows in accordance with its objects that these improvements may be considerably extended by employing negative driving resistances or impedances to annul part of the stalled motor impedance seen looking into the control winding. These further improvements are especially desirable for servo applications since the reduced time constant permits greater servo gain and dynamic accuracy, while the static servo accuracy is increased two-fold by the local circuit suppression of frictional disturbances and the increase in servo gain.

The following theory enables the calculation of motor performance if the driving impedance and mechanical load are known. The restrictions on driving impedance for stability of induction motors are set forth, and a section is included on methods for producing stable negative driving impedance.

Two basic assumptions are made in discussing the direct current motor, (1) that the generated torque is proportional to the control mesh current, and (2) that the effect of shaft motion upon the control mesh is to introduce a counter electromotive force proportional to shaft speed.

Figure 1:
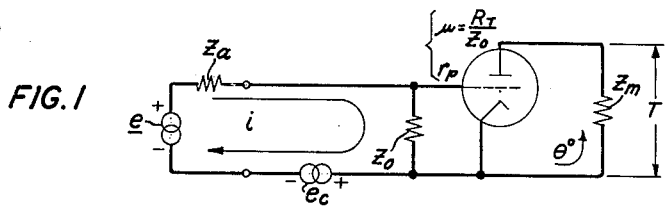
Fig. 1 illustrates by way of explanation the equivalent circuit of the motor and control circuit.

With these assumptions, the motor and control circuit may be represented by the equivalent circuit of Fig. 1. An electrical current $i$ flows in the control mesh, and a mechanical "current" $\dot{\theta}$, representing angular speed of the motor shaft, flows in the mechanical mesh.

The coupling between mechanical mesh and control mesh is shown embodied in a counter electromotive force generator producing a voltage $e_c$ equal to $R_g\dot{\theta}$, and a fictitious vacuum tube having internal plate resistance $r_p$ equal to zero and an amplification factor $\mu = R_t/Z_o$. $Z_o$ is the stalled impedance of the motor control winding and $R_g$, $R_t$ are transfer resistances. The analogy used here puts current equivalent to angular speed and voltage to torque. Thus the ratio of voltage to speed or torque to current is a transfer impedance.

The assumed relations may be expressed in the following two equations, $$i = \frac{e - R_g \dot{\theta}}{Z_o + Z_a} \quad (1)$$

and $$T = R_t i = Z_m \dot{\theta} \quad (2)$$

T is the generated torque, $Z_m$ is the mechanical impedance $T/\dot{\theta}$, and $Z_a$ is the output impedance of the driving amplifier. Substituting (2) in (1), the control current is found to be $$i = \frac{e}{Z_o + Z_a + \frac{R_g R_t}{Z_m}} \quad (3)$$

Thus the motional impedance reflected from the mechanical to the electrical mesh is $$Z_{em} = \frac{R_g R_t}{Z_m}$$

Substituting (3) in (2), there results $$\dot{\theta} = \frac{\frac{R_t}{Z_o + Z_a} e}{Z_m + \frac{R_g R_t}{Z_o + Z_a}} \quad (4)$$

This result may be represented by an equivalent mechanical circuit where the apparent generated torque is $R_t$ times the stalled current $$\frac{e}{Z_o + Z_a}$$

and the impedance reflected into the mechanical mesh from the control mesh is $$Z_{mc} = \frac{R_g R_t}{Z_o + Z_a}$$

If $Z_o + Z_a$ is essentially a resistance $R_o + R_a$, then $Z_{mc}$ is an inversely proportional mechanical resistance or viscous friction element given by $$\frac{R_p R_t}{R_o + R_a}$$

It is this apparent viscous friction reflected into the mechanical mesh which, when made large by proper design, overrides the inertial and frictional torques, thereby making for smooth running, small time constant response.

Usually $Z_m$ is composed of two elements, a viscous friction resistance $R_m$, and an inertia $J_m$. The term "viscous friction" will be used here to indicate a circuit element which produces a torque drop proportional to speed; that is, a mechanical resistance. For simplicity we assume that $Z_o$ and $Z_a$ are essentially resistances $R_o$ and $R_a$ for the servo frequencies. Then $Z_{mc}$ is essentially resistive and the time constant of the equivalent mechanical mesh becomes $$\tau = \frac{J_m}{R_m + \frac{R_g R_t}{R_o + R_a}} \quad (5)$$

If $R_m$ is small compared with $R_{mc}$ then the time constant becomes $$\tau \doteq J_m \bigg/ \frac{R_g R_t}{R_o + R_a}$$

and the speed is given by $\dot{\theta} \doteq e/R_g$

If $R_a$ is infinite, $R_{mc}$ vanishes and $$\tau = \frac{J_m}{R_m} = \tau_m$$

the actual mechanical time constant. For $R_a \ll R_o$, the effective time constant is reduced to $$\tau \doteq \frac{J_m}{R_m + \frac{R_g R_t}{R_o}}$$

The present invention contemplates the reduction of $\tau$ by making $R_a$ negative. As seen from Equation 5 the minimum value of $\tau$ which can be reached by this method is limited only by stability requirements. Thus if $R_a$ could be held stable at $-R_o$, the resistance reflected into the mechanical mesh would be infinite and the circuit time constant would be zero.

Actually, values for $R_a$ of the order of $-0.7R_o$ are readily obtained, and permit a substantial reduction in time constant over the zero impedance drive case. The method used for producing the negative driving impedance employs positive feedback around the power amplifier. An additional advantage thereby gained is that the amplifier gain is increased by the feedback.

In general $Z_o$ may have significant reactive components within the servo frequency band; for instance an inductive component. Then we can improve the servo response by designing $Z_a$ to cancel this inductive component of $Z_o$, in addition to partially cancelling the resistive component. This requires $Z_a$ to be effectively a series combination of a negative resistance and a negative inductance. The same feedback amplifier structures which will be described here for producing negative driving resistance may be adapted by straightforward modifications to produce the combination of negative resistance and negative inductance, or other types of negative impedances.

In most cases the action of the two-phase induction motor at speeds small compared to the synchronous speed is similar to that of the direct current motor as previously discussed. One difference is that the induction motor acts as a demodulator, beating power frequency control mesh current against the power or "carrier" frequency excitation current to produce a steady torque. This demodulation is phase selective; that is, only the component of control mesh current which is in quadrature with respect to the excitation current produces output torque.

Let the back electromotive force induced in the control mesh have a leading phase angle $\Phi$ relative to the torque-producing control mesh current. (That is, relative to that sense of torque-producing control mesh current which opposes the rotation.) Generally speaking $\Phi$ will be found to be positive and less than 90 degrees.

Then, maximum impedance reflection into the mechanical mesh will be obtained if $\Phi_c$, the carrier frequency phase angle of the control mesh impedance $Z_o+Z_a$, is made equal to $\Phi$. Under this condition, all the control mesh current due to the back electromotive force will be effective in producing a torque drop. Also the component of control current due to signal input $e$ may be made completely effective in producing torque by preadjustment of the signal phase.

If these conditions are satisfied all control mesh current will have the proper phase alignment for producing torque. The above conditions are assumed in the rest of the discussion except as noted.

Another common property of two-phase motors not considered in the direct current motor case is the tendency to run on one phase when lightly loaded; that is, with excitation applied and the control winding open-circuited. The driving torque produced under this condition is proportional to speed, for speeds small compared to synchronous speed. This torque may be taken account of by assigning a negative value $-r$ to the internal plate resistance $r_p$ of the fictitious vacuum tube, assumed zero in the direct current motor case. This value $-r$ may be termed the "torque factor."

In considering the alternating-current motor, it is assumed that the phase angle of the amplifier electromotive force has been preadjusted to the torque producing phase. Also $i$ is taken as the magnitude of only the torque-producing component of control mesh current. For generality, it is not assumed that $\Phi=\Phi_c$. Thus the torque-effective counter electromotive force $e_c$ must be written as the actual back electromotive force $R_g\dot{\theta}$ times $\cos(\Phi-\Phi_c)$.

Then the two-phase motor equations corresponding to (1) and (2) are:

$$i=\frac{e-R_g\dot{\theta}\cos(\Phi-\Phi_c)}{|Z_o+Z_a|} \qquad (6)$$

and $$T=R_t i - r_p\dot{\theta}=R_t i + r\dot{\theta}=Z_m\dot{\theta} \qquad (7)$$

$R_t i$ is of course the generated torque due to control mesh current, or two-phase operation, and $r\dot{\theta}$ is the generated torque produced by single phase operation.

By substitutions similar to those for the direct current case the impedance reflected into the mechanical mesh may thus be shown to be a resistance of viscous friction, $$R_{me}=\frac{R_g R_t}{|Z_o+Z_a|}\cos(\Phi-\Phi_c) \qquad (8)$$

If $\Phi=\Phi_c$, then $$R_{me}=\frac{R_g R_t}{|Z_o+Z_a|}$$

an expression very similar to that obtained in the direct current motor case.

If $Z_m$ is a series combination of inertia $J_m$ and viscous friction $R_m$, then the control time constant is $$\tau=\frac{J_m}{R_m-r+R_{me}} \qquad (9)$$

If $R_m+R_{me}=r$, then the time constant is infinite and the angular acceleration of the motor shaft is proportional to the amplifier voltage $e$. This type of characteristic is desirable for many servo applications, but requires additional stabilizing equalization near the gain cross-over frequency of the servo loop. For larger values of $R_{me}$ the time constant is reduced as in the direct current motor case. The steady state speed-voltage characteristic is given by $$\dot{\theta}=\frac{e}{R_m-r+R_{me}} \qquad (10)$$

If $R_m+R_{me}$ is less than $r$ the system becomes unstable and the motor will tend to run away.

If $R_m+R_{me}$ is greater than $r$ the motor circuit will be stable. If at the same time the motor is lightly loaded so that $r>R_m$, then $R_{me}$, the receiver or "carrier" frequency impedance reflected into the electrical control mesh, will be a negative resistance greater in magnitude than the mid-band value of $Z_o+Z_a$. Thus under this condition the total control mesh impedance will be negative and $i$ will be opposite in polarity to that normally expected.

To find the values of driving impedance for which the motor circuit will be stable, set $$R_m+R_{me}-r\geqq 0$$

Substituting for $R_{me}$ from Equation 8, $$\frac{R_g R_t}{|Z_o+Z_a|}\cos(\Phi-\Phi_c)+R_m-r\geqq 0$$

The resulting restrictions on driving impedance may then be summarized as follows:

Case I.—$r>R_m$ (lightly loaded):
The motor circuit will be stable if $\cos(\Phi-\Phi_c)$ is positive and if $$|Z_o+Z_a|\leqq\left|\frac{R_g R_t}{r-R_m}\cos(\Phi-\Phi_c)\right| \qquad (11)$$

Case II.—$r<R_m$ (fully loaded):
(a) There are no restrictions on $|Z_o+Z_a|$ if $\cos(\Phi-\Phi_c)$ is positive.
(b) If $\cos(\Phi-\Phi_c)$ is negative, the motor circuit will be stable when $$|Z_o+Z_a|\geqq\left|\frac{R_g R_t}{r-R_m}\cos(\Phi-\Phi_c)\right| \qquad (12)$$

Since $\Phi_c$ is the carrier frequency angle of $Z_o+Z_a$, the carrier frequency value of $Z_a$ may be found from $$Z_a=|Z_o+Z_a|/\Phi_c-Z_o$$

These cases may be expressed in one general equation if desired by setting the original stability equation equal to C, a constant defined as greater than or equal to zero. Therefore $$\frac{R_g R_t}{|Z_o + Z_a|} \cos(\Phi - \Phi_c) + R_m - r = C$$

and $$|Z_o + Z_a| = \frac{R_g R_t \cos(\Phi - \Phi_c)}{C - R_m + r}$$

Although $\Phi$, the angle of the counter electromotive force relative to torque-producing control current, was originally described as a leading angle and less than 90 degrees the above stability equations apply for any possible value of $\Phi$.

These stability conditions apply to the open cycle servo system. They may be desirable but are not strictly necessary for a closed cycle system.

Figure 2:
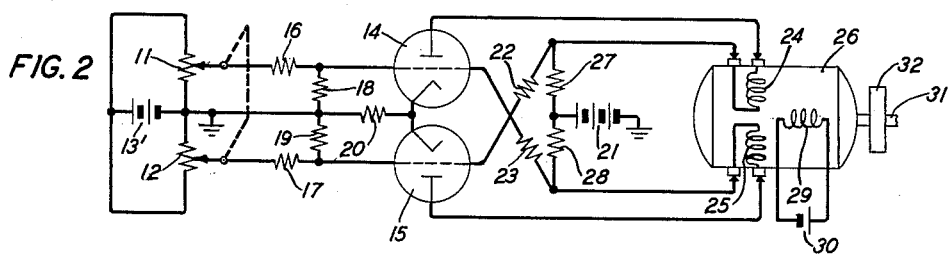
Fig. 2 is a diagrammatic view of a direct current servo system embodying an application of the invention.

An application of the invention is illustrated in Fig. 2 which shows an open cycle servo system having a suitable feedback amplifier for driving a separately excited direct current motor, and at the same time presenting a predetermined negative resistance to the control windings of the motor. The mechanical input signal is applied to the arms of the ganged potentiometers 11 and 12 which are energized by the voltage source 13. The electrical signal thus obtained is applied to the grids of the two vacuum tubes 14 and 15 through the padding resistors 16 and 17. The grids are connected through resistors 18 and 19 to ground. The two cathodes are tied together and returned through the self-biasing resistor 20 to ground. The anodes of 14 and 15 draw current through the positive source 21, monitoring resistors 27 and 28, and the armature windings 24 and 25, respectively. The windings 24 and 25 are two halves of a split armature direct current motor 26, and are so poled that when the currents through each are equal, there is a zero motor torque. Any unbalance in these currents will produce motor torque thus causing the motor to operate in a direction depending upon the relative magnitudes of the voltages applied to the grids of 14 and 15. Motor 26 may be of the general type having four armature brushes. The juncture of 24 and 27 is tied through the padding resistor 22 to the grid of 15. Similarly the juncture of 25 and 28 is tied through the padding resistor 23 to the grid of 14. Thus the incremental feedback voltage reaching each grid is proportional to the incremental plate current of the opposite triode, thereby yielding the desired positive feedback structure. The high positive operating potential of junctures 24, 27 and 25, 28 is attenuated by the padding network of resistors 23, 18, 16, 11 and 22, 19, 17, 12, and further offset by the bias voltage developed across 20, so that the tubes may operate at a proper grid cathode bias. In general the following relative resistance values exist: 16=17; 18=19; 22=23; 27=28; 18>16, 22; and 22>>27. The exact values are determined to give a feedback return ratio as set forth in connection with Fig. 4, thereby causing the amplifier to present the desired value of negative resistance to the windings 24 and 25. The field winding 29 of the motor is supplied with power from source 30. An inertia load 32 may be coupled to the motor shaft 31.

Figure 3:
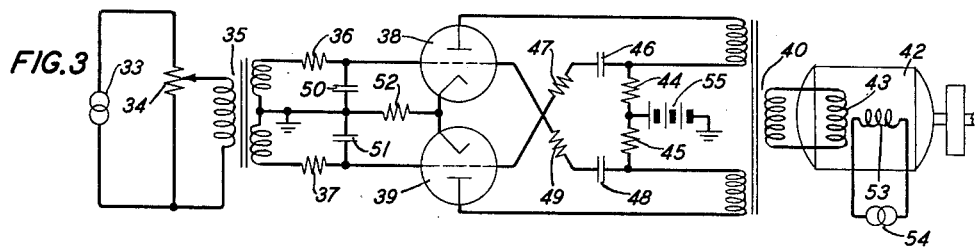
Fig. 3 is a diagrammatic view of an alternating-current servo system illustrating a second possible application of the invention.

In like manner Fig. 3 illustrates an open cycle servo system using a positive feedback driving amplifier suitable for alternating current, and presenting a negative resistance to the control winding of a driven alternating current motor. The input signal is tapped off by potentiometer 34 across source 33. This signal is coupled to the push-pull amplifier comprising tubes 38 and 39 through the transformer 35 and grid resistances 36 and 37. The output of the amplifier may be coupled through the transformer 40 to the control winding 43 of a two-phase induction motor 42. This output may, however, be coupled to the control winding of any alternating current motor. The feedback voltages are developed across resistors 44 and 45, which are in series with the load and the power source 55. Positive feedback is secured by applying the voltage developed across resistance 44 to the grid of tube 39 through condenser 46 and resistor 47. Consequently, the voltage fed back to the grid is essentially in phase with the signal voltage at this grid. A similar situation exists at the grid of tube 38 by means of a coupling circuit comprising 48 and 49. Condenser 50 connects the grid of tube 38 to ground, and is proportioned together with condenser 48 and resistors 36, 49 to produce the desired phase shift around the loop at the carrier frequency. Condenser 51 provides a similar effect at the grid of tube 39. The second phase winding 53 of motor 42 is supplied from a power source 54.

Figure 4:
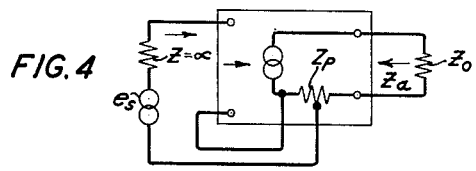
Fig. 4 shows by way of explanation the feedback configuration involved in the circuits of Fig. 2 and Fig. 3.

Fig. 4, which shows the equivalent circuit of the feedback configurations of Fig. 2 and Fig. 3, will be used to determine the proper value of the feedback return ratio applicable in each case for a particular motor.

$Z_o$ is the load impedance (control impedance of stalled motor), and $Z_p$ is the amplifier output impedance without feedback. The feedback return is taken from a tap on $Z_p$ and thus is proportional to the load current. This type of feedback, i. e., a positive feedback of voltage proportional to the current delivered to the load, produces a negative impedance in the output of the amplifier. Both this type of feedback and the negative impedance characteristic it produces are well known in the art. The characteristic has been designated therein as a "series-type" negative impedance or as a "current controlled-type" negative impedance. The first term is appropriate since it defines the derivation of the fed back wave from an impedance in series with the load. The second term connotates the nature of the negative impedance characteristic thus obtained, i. e., a characteristic in which the voltage across the element decreases as the current through it is increased. It may readily be shown that the effective output impedance in the presence of feedback is $$Z_a = (1 - \mu\beta_{Sh}) Z_p \qquad (13)$$

where $\mu\beta_{Sh}$ is the return ratio with $Z_o$ shorted. If $\mu\beta_{Sh}$ is positive and larger than unity, then $Z_a$ becomes a negative impedance. If $\mu\beta_N$ is the normal return ratio (with the short removed), then $$\mu\beta_{Sh} = \frac{Z_p + Z_o}{Z_p} \mu\beta_n \qquad (14)$$

and (13) may be rewritten as $$Z_a = Z_p - (Z_p + Z_o) \mu\beta_N$$

If $Z_o$ has appreciable reactive components over the servo band of frequencies then $Z_a$ may be made to cancel these reactive components, as well as partially cancel the resistive component of $Z_o$. This may be accomplished by proper design of the return ratio $\mu\beta_{Sh}$, as seen from Equation 13.

Again assuming for simplicity that $Z_p$, $Z_o$, and the desired $Z_a$ are resistances for the frequencies of interest, it may be seen from (13) and (14) that $\mu\beta_{sh}$ and $\mu\beta_N$ should have zero phase shift over a corresponding frequency band. Since the loop gain must be less than unity for stability, the feedback loop may be confined to one vacuum tube stage. Accordingly it is reasonable to use a rather small gain margin. Setting this margin at $3db$, then $\mu\beta_N=0.7$ at low frequencies, and $$-\frac{Z_a}{Z_o}=0.7-0.3\frac{Z_p}{Z_o}$$

From this it is apparent that $$\frac{Z_p}{Z_o}$$

must be fairly small to maximize $$-\frac{Z_a}{Z_o}$$

If $$\frac{Z_p}{Z_o}=0.4$$

the power loss due to mismatching is only 17 per cent, and a value of $-0.58$ is obtained for $$\frac{Z_a}{Z_o}$$

This will permit a time constant reduction of about 2.5 times compared with the zero driving impedance case.

From the foregoing requirement that the amplifier impedance without feedback be small compared with the load, it is evident that this method for producing negative driving impedances is most easily obtained with triode power stages.

However, it is possible to combine negative shunt feedback and positive series feedback in such a way as to produce a suitably large and stable negative output impedance, even when the amplifier impedance $Z_p$ is high compared with the load $Z_o$. Such feedback renders it possible to obtain a larger magnitude of negative impedance for a given stability margin.

Figure 5:
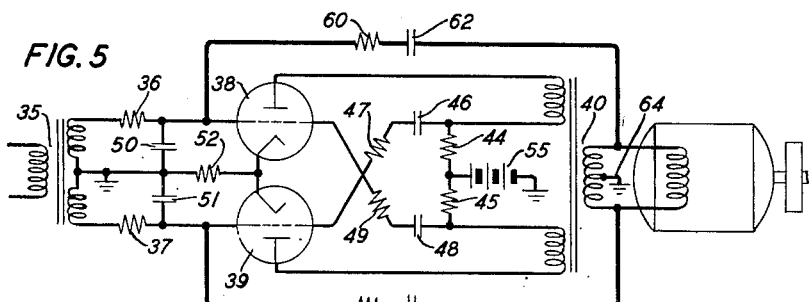
Fig. 5 illustrates a further feature of the invention in relation to Fig. 3.

Fig. 5 shows this feature of the invention by way of illustration wherein negative shunt feedback is obtained by the addition of components 60, 61, 62 and 63 to the amplifier illustrated in Fig. 3. A grounded center-tap connection 64 is added to the secondary winding of transformer 40. Negative feedback is obtained by applying an out of phase voltage from the secondary winding of 40 to the grid of tube 38 through condenser 62 and resistor 60. Likewise an out of phase voltage is applied to the grid of tube 39 through condenser 63 and resistor 61. Since the phase shift properties of the negative feedback voltage should equal the phase shift properties of the positive feedback voltage, the RC time constants of 60, 62 and 61, 63 should substantially equal the time constants of 46, 47 and 48, 49, respectively.

For simplicity the dual feedback feature of the invention has been shown in connection with triode output stages, but this method is applicable either to triode or pentode stages.

A similar negative feedback path may be added to the direct current system shown in Fig. 2. In this connection the same considerations and advantages would apply as detailed for the circuit of Fig. 3, and the respective impedance values in either case are chosen in accordance with the following explanation directed to Fig. 6.

Figure 6:
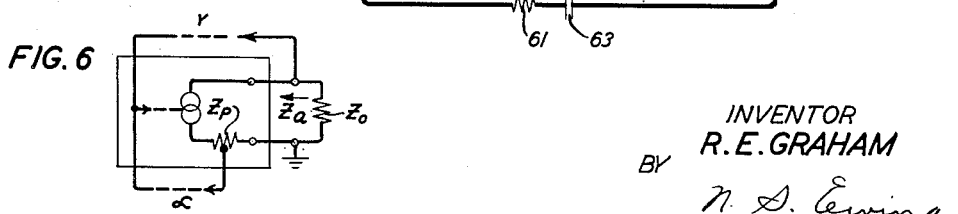
Fig. 6 shows by way of explanation the feedback configuration involved in the circuit of Fig. 5.

Fig. 6 represents the feedback configuration utilized in the amplifier of Fig. 5. $\alpha$ and $\gamma$ represent the loop transmission for the series feedback path and the shunt feedback path respectively. Thus the total loop transmission is $\mu\beta=\alpha+\gamma$. Then, $$n=-\frac{K-(1+K)\alpha}{1-(1+K)\gamma} \quad (15)$$

and $$\mu\beta=\frac{n+K}{1+K}+(1-n)\gamma \quad (16)$$

where $$n=-\frac{Z_a}{Z_o} \text{ and } K=\frac{Z_p}{Z_o}$$

For the present application, $n$ is positive and must be less than unity for loop stability. Then if $\alpha$ is made positive and $\gamma$ negative, yielding positive series feedback and negative shunt feedback, the effect of the term $(1-n)\gamma$ in Equation 16 is to reduce the net positive loop transmission obtained for values of $n$ and $K$.

Thus if a ratio of negative driving impedance to load impedance of $-0.6$ is required, and $$K=\frac{Z_p}{Z_o}$$

is assumed to be 3, then the loop transmission is $$\mu\beta=0.9+0.4\gamma$$

Thus zero shunt feedback ($\gamma=0$) would yield a $\mu\beta$ of 0.9 and a stability margin of less than 1 db. By introducing 6 db of negative shunt feedback ($\gamma=-1$) the loop transmission is reduced to $\mu\beta=0.5$, providing a stability margin of 6 db. (The corresponding series loop transmission is $\alpha=1.5$.)

It is interesting to note that the combination of series and shunt feedback may be used to provide a negative driving impedance even when the net loop transmission $\mu\beta=0$. This case is obtained by setting $\gamma=-\alpha$ in Equation 19, yielding $$-\frac{Z_a}{Z_o}=n=-\frac{K-(1+K)\alpha}{1+(1+K)\alpha} \quad (17)$$

If $$\alpha > \frac{K}{1+K}$$

the resulting driving impedance $Z_a$ is negative. As an illustration set $K=1$ in 17. Then $$n=\frac{2\alpha-1}{2\alpha+1}$$

Further, if $\alpha=-\gamma=10$, then $n=0.9$ with zero net feedback. This would afford a possible time constant reduction of about ten times.

In evaluating this use of fairly large amounts of positive series and negative shunt feedback which substantially annul each other, it should be noted that the two feedback paths may be so chosen as to include all the amplifier stages in common, differing only in their "potentiometer" factors at the output mesh. Thus changes in amplifier gain would not change the relative values of the two loop feedbacks, leaving the cancellation unchanged. However, the ratio of the shunt feedback to the series feedback is proportional to the load impedance $Z_o$. Thus, changes in $Z_o$ will seriously affect the balance. For this reason stability of $Z_o$ is the most effective limiting factor.

Although the invention has been shown by way of illustration in connection with a simple open cycle servo system, it is understood that the invention may also be adapted to other types of motor systems, including all modifications of the closed cycle-servo loop.

What is claimed is:

1. An electromechanical signal transmitting system comprising an amplifier having an input and an output circuit, a rotary motor connected to said output circuit, and a positive feedback path in said amplifier connected between said input and output circuits for waves series-derived from said output circuit.

2. In combination, a two-phase induction motor having a control winding and an excitation winding, an amplifier connected to said motor for supplying current to said control winding, and means for rendering the output impedance of said amplifier negative including a positive feedback circuit in said amplifier for waves series-derived from the output circuit of said amplifier.

3. A servo system comprising a two-phase induction motor having a control winding and an excitation winding, an amplifier for supplying current to said control winding, and means for rendering the impedance of said amplifier as viewed from said control winding a negative impedance, said means comprising means producing in said amplifier positive feedback of waves series-derived from the output circuit of said amplifier.

4. A servo system comprising a motor, an amplifier for supplying driving current to said motor, and means for rendering the impedance of said amplifier as viewed from said motor negative, said means comprising a positive feedback path in said amplifier for waves series-derived from the output circuit of said amplifier and a negative feedback path for waves shunt-derived from the output circuit of said amplifier.

5. A servo system comprising a rotary motor having a control winding, an amplifier for supplying current to said control winding, said amplifier comprising at least two vacuum discharge devices each having at least a control grid, an anode and a cathode, the anodes of two of said discharge devices connected to supply currents in opposing relation to said control winding, an impedance means connected in series with each of said anodes, and a feedback connection for impressing the voltage developed across said impedance means in the anode circuit of one of said discharge devices upon the grid of the other of said discharge devices thereby rendering the impedance of said amplifier as viewed from said control winding a negative impedance.

6. The combination according to claim 5 including a second feedback connection from the output of said amplifier to the input of said amplifier for negatively feeding back waves shunt-derived from the output of said amplifier.

7. A servo system comprising a motor having an inertia $J_m$, a stalled impedance $Z_o$, a torque factor $r$, a viscous friction impedance $R_m$, and means for reducing the time constant of said motor to a value $$\tau = \frac{J_m}{R_m - r + \frac{R_g R_t}{|Z_o + Z_a|}}$$

wherein $R_g$ being a constant of proportionality between the back electromotive force and the motor speed, $R_t$ being a constant of proportionality between the torque developed and the control mesh current, said means comprising an amplifier for supplying the driving current to said motor, said amplifier having an output impedance $Z_a$ negative as viewed from said motor and the absolute value thereof expressible by $$|Z_o + Z_a| = \frac{R_g R_t \cos(\Phi - \Phi_c)}{C - R_m + r}$$

wherein $C$ being any number $\geq 0$, $\phi$ being the angle between the back electromotive force and the torque-producing component of the control mesh current, and $\phi_c$ being the angle of the control mesh current.

8. An electromechanical system for accurately transmitting signals of a range of frequencies extending down to zero frequency comprising the combination of a rotary electric motor inherently having an appreciable value of inertia and thereby a large time constant, an amplifier having an input circuit and an output circuit, said output circuit connected to supply driving current to said motor, and means for supplying said signals to said input circuit to be amplified by said amplifier, said amplifier having a negative impedance for said signals as viewed from said output circuit whereby the time constant of said system is substantially reduced.

ROBERT E. GRAHAM.

References Cited in the file of this patent

UNITED STATES PATENTS

| Number | Name | Date |
|---|---|---|
| 2,333,393 | Ryder | Nov. 2, 1943 |